(12) United States Patent
Yamamoto

(10) Patent No.: US 9,247,079 B2
(45) Date of Patent: Jan. 26, 2016

(54) INFORMATION PROCESSING APPARATUS

(71) Applicant: KYOCERA Document Solutions Inc., Osaka-shi, Osaka (JP)

(72) Inventor: Yuki Yamamoto, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/160,468

(22) Filed: Jan. 21, 2014

(65) Prior Publication Data
US 2014/0211269 A1    Jul. 31, 2014

(30) Foreign Application Priority Data

Jan. 28, 2013 (JP) .................. 2013-013271

(51) Int. Cl.
H04N 1/40    (2006.01)
H04N 1/00    (2006.01)

(52) U.S. Cl.
CPC ....... *H04N 1/00127* (2013.01); *H04N 1/00167* (2013.01); *H04N 1/00188* (2013.01)

(58) Field of Classification Search
None
See application file for complete search history.

(56) References Cited

U.S. PATENT DOCUMENTS

| 2002/0016888 | A1 |   | 2/2002  | Kobayashi |
| 2004/0039903 | A1 | * | 2/2004  | Wise et al. ................ 712/300 |
| 2006/0034628 | A1 | * | 2/2006  | Chihara .................... 399/27 |
| 2008/0005207 | A1 |   | 1/2008  | Kumazawa et al. |
| 2008/0250213 | A1 | * | 10/2008 | Holt ........................ 711/159 |
| 2011/0096197 | A1 | * | 4/2011  | Kusaka et al. ........... 348/231.5 |
| 2011/0281532 | A1 | * | 11/2011 | Shin et al. ................. 455/77 |
| 2011/0302334 | A1 | * | 12/2011 | Ponnatota et al. ........ 710/30 |
| 2012/0084485 | A1 | * | 4/2012  | Tang et al. ............... 710/313 |
| 2012/0170083 | A1 | * | 7/2012  | Joh ........................ 358/475 |

FOREIGN PATENT DOCUMENTS

| JP | 06232892 A    | 8/1994  |
| JP | 2001273191 A  | 10/2001 |
| JP | 2002049604 A  | 2/2002  |
| JP | 2003500742 A  | 1/2003  |
| JP | 2005322049 A  | 11/2005 |
| JP | 2008009696 A  | 1/2008  |
| WO | 0072167 A1    | 11/2000 |

* cited by examiner

*Primary Examiner* — John Wallace
(74) *Attorney, Agent, or Firm* — Alleman Hall McCoy Russell & Tuttle LLP

(57) ABSTRACT

An information processing apparatus includes first electronic circuit and one or a plurality of second electronic circuits. The first electronic circuit has a first buffer for storing information, and is configured to execute predetermined first information processing by reading out information from a memory connected via a first transmission path, and write the information processed by the first information processing into the memory. The one or plurality of second electronic circuits have a second buffer for storing information, and are connected to the first electronic circuit via a second transmission path different from the first transmission path, and the one or plurality of second electronic circuits are configured to execute second information processing different from the first information processing. The first electronic circuit is configured to execute the first information processing, using the second buffer of the second electronic circuit that is in an unused state and the first buffer.

7 Claims, 4 Drawing Sheets

INFORMATION PROCESSING APPARATUS

INCORPORATION BY REFERENCE

This application is based upon and claims the benefit of priority from the corresponding Japanese Patent Application No. 2013-013271 filed on Jan. 28, 2013, the entire contents of which are incorporated herein by reference.

BACKGROUND

The present disclosure relates to an information processing apparatus including a plurality of electronic components having buffers used for information processing.

An information processing apparatus such as a scanner or a copier has a plurality of electronic circuits for executing various image processes for image data read from a document sheet. For example, an information processing apparatus having an image reading portion for reading image data of the front side and the back side of a document sheet simultaneously has an electronic circuit for executing image processing for image data of the front side read by the image reading portion and an electronic circuit for executing image processing for image data of the back side read by the image reading portion. Specifically, each electronic circuit has a buffer for storing image data, and reads out image data from a memory connected via a transmission path such as a bus and stores the image data into the buffer. Then, the electronic circuit performs image processing for the image data, stores the resultant image data into the buffer, and writes the image data processed by the image processing into the memory. It is noted that an electronic circuit having buffers of two systems of an active system and a standby system is conventionally known.

SUMMARY

An information processing apparatus according to the present disclosure includes a first electronic circuit and one or a plurality of second electronic circuits. The first electronic circuit has a first buffer for storing information, and is configured to execute predetermined first information processing by reading out information from a memory connected via a first transmission path, and write the information processed by the first information processing into the memory. The one or plurality of second electronic circuits have a second buffer for storing information, and are connected to the first electronic circuit via a second transmission path different from the first transmission path, and the one or plurality of second electronic circuits are configured to execute second information processing different from the first information processing. The first electronic circuit is configured to execute the first information processing, using the second buffer of the second electronic circuit that is in an unused state and the first buffer.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Schematic Configuration of Scanner 10

Figure 1:
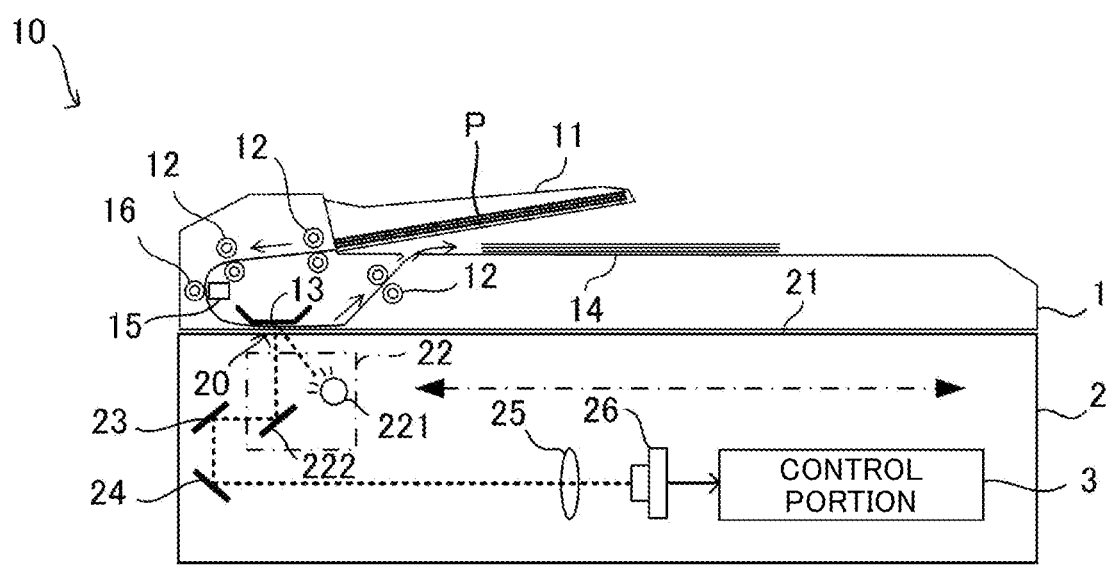
FIG. 1 is a schematic configuration diagram of a scanner according to an embodiment of the present disclosure.

As shown in FIG. 1, a scanner 10 according to an embodiment of the present disclosure includes an ADF 1, an apparatus main body 2, and a control portion 3. The scanner 10 is merely an example of an information processing apparatus according to the present disclosure. The present disclosure is also applicable to information processing apparatuses such as a printer, a facsimile apparatus, a copy machine, a multifunction peripheral, a personal computer, a tablet terminal, a smartphone, and a mobile phone.

The ADF 1 includes a document set portion 11, a plurality of conveying rollers 12, a document holder 13, a sheet discharge portion 14, a CIS 15, and a white reference roller 16.

By driving each conveying roller 12 by a motor (not shown), the ADF 1 causes a document sheet P set on the document set portion 11 to pass through a position opposing to the CIS 15 and through a reading position 20 according to a CCD 26 described later, to convey the document sheet P to the sheet discharge portion 14. The document holder 13 is located above the reading position 20 with a space provided therebetween so as to allow a document sheet P to pass therethrough, and has a white sheet on a lower surface thereof (a surface on a contact glass 21 side). It is noted that the white sheet of the document holder 13 is used for acquiring white reference data as a reference of white color for image data to be read by the CCD 26 described later.

The CIS 15 is an image reading portion having an image sensor of close-contact type for reading image data from the back side of a document sheet P conveyed by the ADF 1. Upon reading an image of a document sheet P by the CIS 15, the document sheet P is pressed by the white reference roller 16 so that the document sheet P comes into close contact with a contact glass (not shown) of the CIS 15. The white reference roller 16 is colored in white uniformly on its entire surface, and is used for acquiring white reference data as a reference of white color for image data to be read by the CIS 15.

The apparatus main body 2 includes the contact glass 21, a light source unit 22, mirrors 23 and 24, an optical lens 25, the CCD (Charge Coupled Device) 26, and the like.

The contact glass 21 is located on an upper surface of the apparatus main body 2, and is a transparent document table that allows a document sheet P to be placed thereon. The reading unit 22 includes an LED light source 221 and a mirror 222, and can be moved in the right-left direction in FIG. 1 by a motor not shown. The mirror 222 reflects, toward the mirror 23, light radiated from the LED light source 221 and reflected by the surface of the document sheet P present at the reading position 20 on the contact glass 21. The light reflected by the mirror 222 is guided by the mirrors 23 and 24 to the optical lens 25. The optical lens 25 converges the incident light into the CCD 26. The CCD 26 is an image reading portion having a photoelectric conversion element and the like for inputting, to the control portion 3, an electric signal corresponding to the reception amount of the incident light from the optical lens 25, as image data of the surface of the document sheet P. Therefore, the scanner 10 can read image data simultaneously from the front side and the back side of a document sheet P conveyed by the ADF 1, using the CIS 15 and the CCD 26.

System Configuration of Control Portion 31

Figure 2:
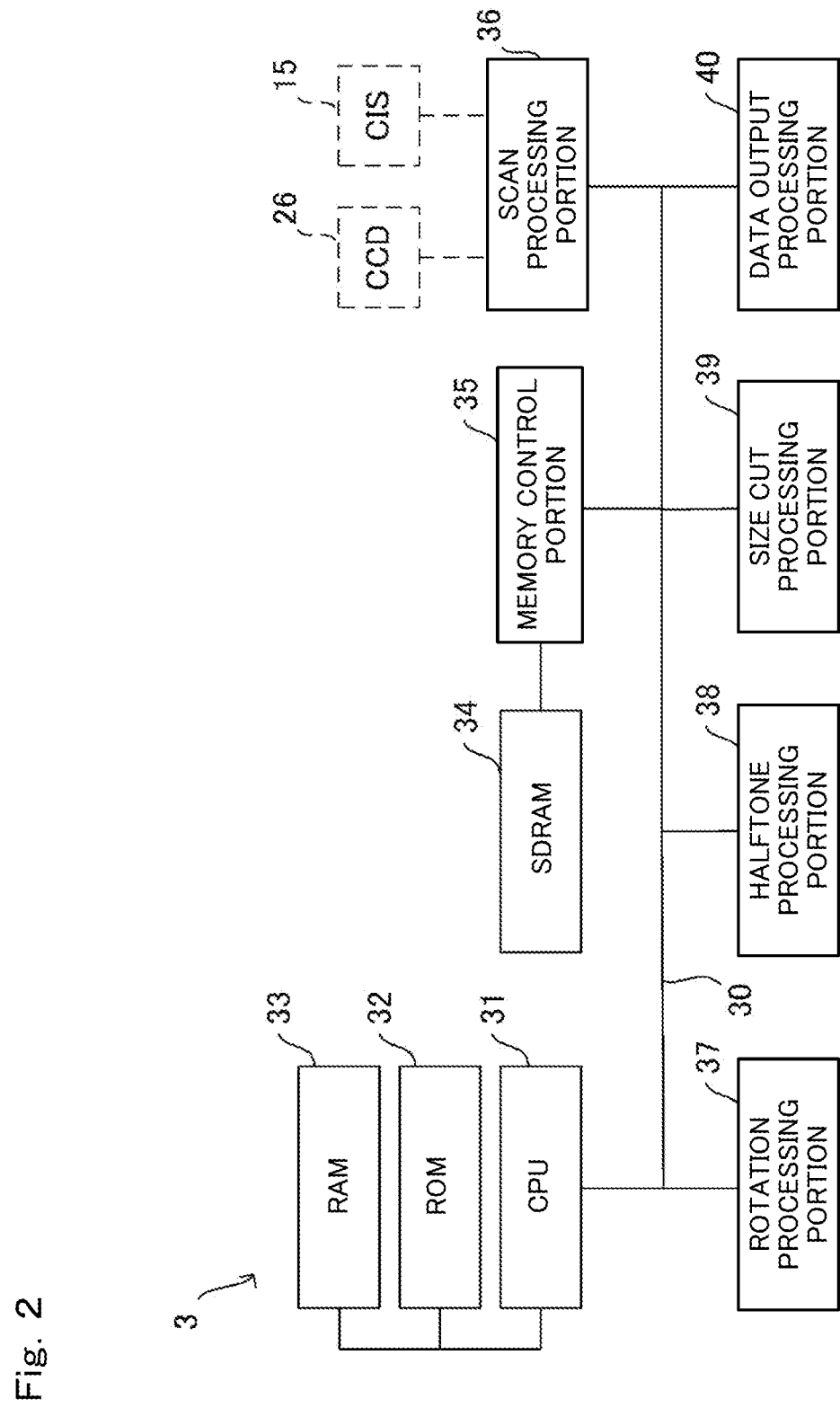
FIG. 2 is a block diagram showing the system configuration of a control portion of the scanner according to the embodiment of the present disclosure.

Next, with reference to FIG. 2, the system configuration of the control portion 3 will be described. As shown in FIG. 2, the control portion 3 includes a bus 30, a CPU 31, a ROM 32, a RAM 33, an SDRAM 34, a memory control portion 35, a scan processing portion 36, a rotation processing portion 37, a halftone processing portion 38, a size cut processing portion 39, a data output processing portion 40, and the like. The bus 30 is a transmission path used for transmission of data among the CPU 31, the memory control portion 35, the scan processing portion 36, the rotation processing portion 37, the halftone processing portion 38, the size cut processing portion 39, and the data output processing portion 40.

The CPU 31 performs overall control of the scanner 10 by executing a predetermined control program stored in the ROM 32. For example, the CPU 31 controls the ADF 1 and the apparatus main body 2 to execute image reading processing such as one-side image reading processing or both-side image reading processing for reading image data from one or both of the front side and the back side of a document sheet P by using the CIS 15 and the CCD 26. The RAM 33 is volatile storage means, and is used as temporary storage means in various processes executed by the CPU 31.

The SDRAM 34 is a volatile memory such as a DDR-SDRAM (Double-Data-Rate Synchronous Dynamic Random Access Memory) used as temporary storage means (working area) for image data in the control portion 3.

The memory control portion 35, the scan processing portion 36, the rotation processing portion 37, the halftone processing portion 38, the size cut processing portion 39, and the data output processing portion 40 are integrated circuits such as ASIC.

The memory control portion 35 controls reading and writing of data with respect to the SDRAM 34. Specifically, reading and writing of image data with respect to the SDRAM 34 by the scan processing portion 36, the rotation processing portion 37, the halftone processing portion 38, the size cut processing portion 39, and the data output processing portion 40, are executed via the memory control portion 35. The memory control portion 35 includes a write buffer for writing used when image data is written from the bus 30 into the SDRAM 34, and a read buffer for readout used when image data is read out from the SDRAM 34 and then outputted to the bus 30.

In the memory control portion 35, when writing processing of image data into the SDRAM 34 is intensively performed, the write buffer is saturated, so that writing of image data into the SDRAM 34 is restricted, but readout of image data from the SDRAM 34 can be performed. Similarly, when readout processing of image data from the SDRAM 34 is intensively performed, the read buffer is saturated, so that readout of image data from the SDRAM 34 is restricted, but writing of image data into the SDRAM 34 can be performed.

The scan processing portion 36 performs various image processes such as shading correction and gamma correction for image data outputted from the CIS 15 and the CCD 26, and writes the image data into the SDRAM 34. Thereafter, the scan processing portion 36 reads out the image data from the SDRAM 34 by every predetermined amount to execute compression processing of compressing the image data into a JBIG format or a JPEG format, and writes the image data processed by the compression processing into the SDRAM 34. The details of the compression processing will be described later.

The rotation processing portion 37 reads out image data stored in the SDRAM 34, and executes rotation processing of rotating the image direction of the image data by 90 degrees or −90 degrees. In the rotation processing, a buffer provided in the rotation processing portion 37 is used as a working area. Thereafter, the rotation processing portion 37 writes image data processed by the rotation processing into the SDRAM 34.

The halftone processing portion 38 reads out the image data processed by the rotation processing and stored in the SDRAM 34, and executes halftone processing for the image data. In the halftone processing, a buffer provided in the halftone processing portion 38 is used as a working area. Thereafter, the halftone processing portion 38 writes the image data processed by the halftone processing into the SDRAM 34.

The size cut processing portion 39 reads out the image data processed by the halftone processing and stored in the SDRAM 34, and executes size cut processing of deleting unnecessary image area of the image data. In the size cut processing, a buffer provided in the size cut processing portion 39 is used as a working area. Thereafter, the size cut processing portion 39 writes the image data processed by the size cut processing into the SDRAM 34.

The data output processing portion 40 executes data output processing of reading out one page or a plurality of pages of image data processed by the size cut processing and stored in the SDRAM 34 and outputting the read image data to the outside. Specifically, the data output processing portion 40 transmits the image data to a terminal (not shown) such as a personal computer connected to the scanner 10, or stores the image data into storage means (not shown) such as a hard disk provided in the scanner 10. In the data output processing, a buffer provided in the data output processing portion 40 is used as a working area.

Scan Processing Portion 36

Hereinafter, with reference to FIGS. 3 and 4, the scan processing portion 36 will be described in detail.

Figure 3:
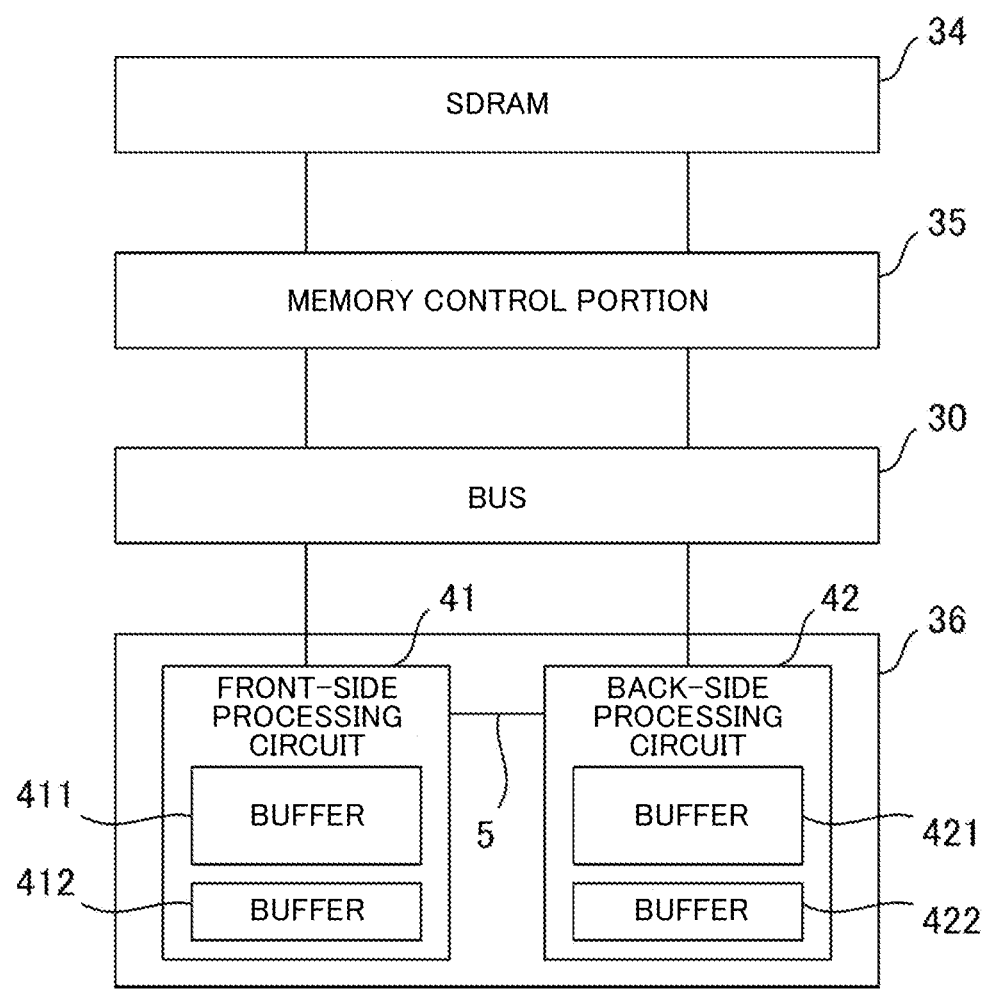
FIG. 3 is a major part block diagram about a scan processing portion for executing compression processing for image data in the scanner according to the embodiment of the present disclosure.
Figure 4:
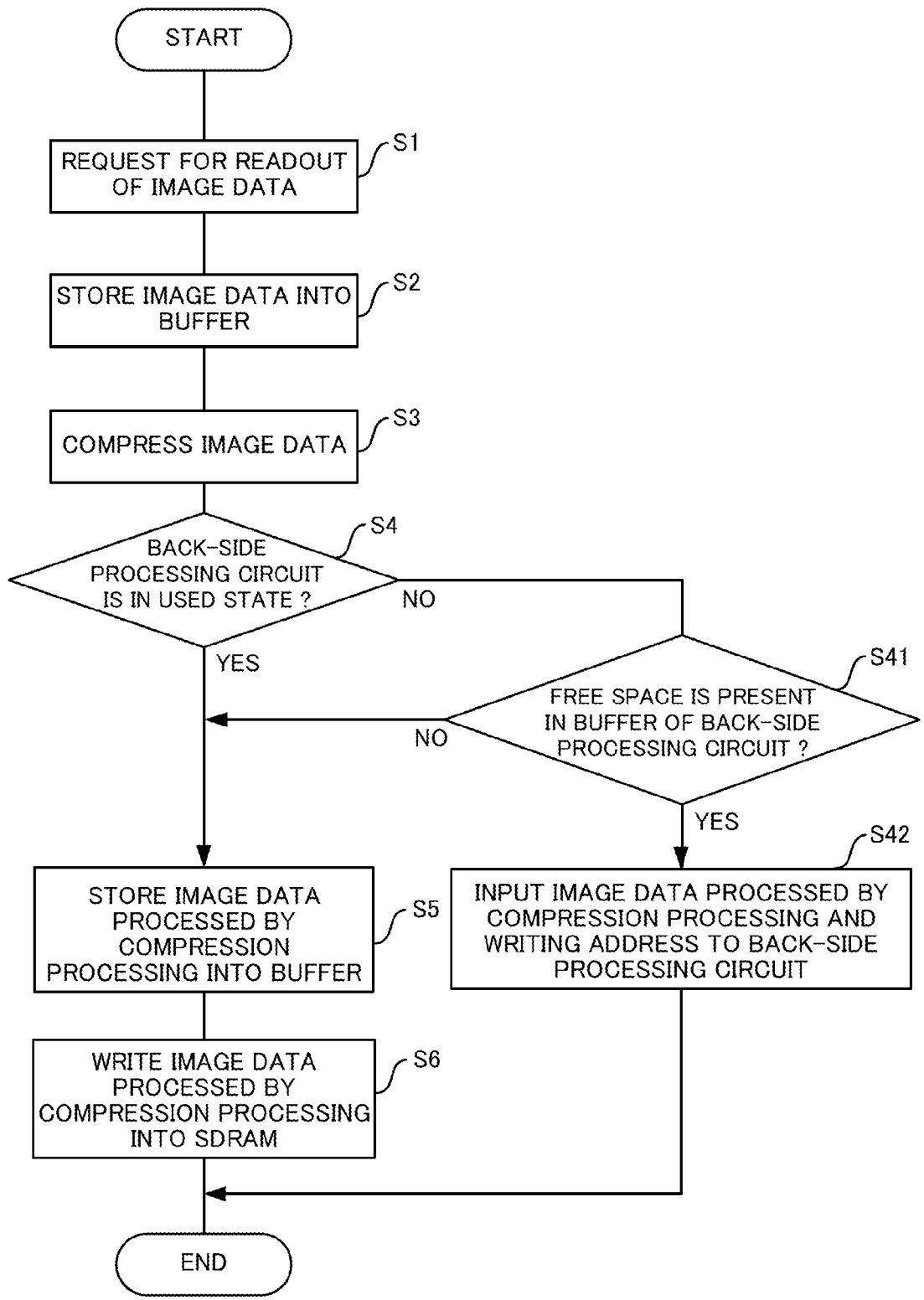
FIG. 4 is a flowchart for explaining an example of compression control processing executed by the scanner according to the embodiment of the present disclosure.

As shown in FIG. 3, the scan processing portion 36 includes a front-side processing circuit 41 (example of first electronic circuit) and a back-side processing circuit 42 (example of second electronic circuit). The front-side processing circuit 41 and the back-side processing circuit 42 are electronic circuits such as ASIC connected to the SDRAM 34 via the bus 30 (example of first transmission path) and the memory control portion 35 and directly connected with each other through a transmission path 5 (example of second transmission path). The front-side processing circuit 41 has a buffer 411 and a buffer 412 (example of first buffer) for storing image data (example of information), and the back-side processing circuit 42 has a buffer 421 and a buffer 422 (example of second buffer) for storing image data. The buffer 411 and the buffer 421 are read buffers used when image data is read out from the SDRAM 34, and the buffer 412 and the buffer 422 are write buffers used when image data is written into the SDRAM 34. In the front-side processing circuit 41 and the back-side processing circuit 42, compression processing for image data is executed, so that the information amount of the image data after the compression processing is smaller than the information amount of the image data before the compression processing. Therefore, the capacity of the buffer 412 is smaller than the capacity of the buffer 411, and the capacity of the buffer 422 is smaller than the capacity of the buffer 421.

The back-side processing circuit 42 executes compression processing (example of information processing) of compressing image data of the back side of a document sheet P read by the CIS 15, from a bitmap format into a JBIG format, a JPEG format, or the like, for example. Specifically, the back-side processing circuit 42 reads out image data from the SDRAM 34 to store the read image data into the buffer 421, and executes the compression processing for the image data stored in the buffer 421. Then, the image data processed by the compression processing is stored into the buffer 422, and the image data is written from the buffer 422 into the SDRAM 34. That is, in the back-side processing circuit 42, the buffer 421 and the buffer 422 are used as working areas for the compression processing. It is noted that when the one-side image reading processing is executed for reading image data of the front side of a document sheet P in the scanner 10, the back-side processing circuit 42 becomes an unused state.

On the other hand, the front-side processing circuit 41, similarly to the back-side processing circuit 42, executes compression processing (example of information processing) of compressing image data of the front side of a document sheet P read by the CCD 26, from a bitmap format into a JBIG format, a JPEG format, or the like, for example. However, the front-side processing circuit 41 executes processing that differs depending on whether or not the back-side processing circuit 42 is in a used state. Specifically, when the back-side processing circuit 42 is in a used state, the front-side processing circuit 41 uses the buffer 411 and the buffer 412 as working areas for the compression processing. On the other hand, when the back-side processing circuit 42 is in an unused state, the front-side processing circuit 41 can use the buffer 421 and the buffer 422 in addition to the buffer 411 and the buffer 412, as working areas for the compression processing.

Here, for example, when writing of data into a memory is intensively performed, the writing of image data from an electronic circuit into the memory is delayed. In this case, in the electronic circuit, since no free space occurs in a buffer for storing image data processed by information processing, next image data cannot be read out from the memory, so that the processing capability of the electronic circuit is reduced in this period. For example, it is conceivable that in an electronic circuit having buffers of two systems of an active system and a standby system as described above, image data to be written into a memory is saved into the buffer of the standby system. However, in the case of providing buffers of two systems of an active system and a standby system for each electronic circuit, the circuit configuration is complicated. In contrast, in the case of the scanner 10 according to the present disclosure, in the information processing apparatus including a plurality of electronic circuits, the buffers provided for the electronic circuits are reduced while reduction in the processing capability of the electronic circuits is suppressed.

Hereinafter, with reference to FIG. 4, an example of a procedure of compression control processing executed by the front-side processing circuit 41 will be described.

First, the front-side processing circuit 41 transmits a readout request for image data of the front side of a document sheet P to the memory control portion 35 via the bus 30, and thereby sequentially reads out the image data of the front side of the document sheet P by every predetermined amount from the SDRAM 34 (S1). The readout request includes information about a readout address where the image data to be read out from the SDRAM 34 is stored. The readout address is information set in advance by the CPU 31 and inputted to the front-side processing circuit 41 in the image reading processing executed by the CPU 31. Then, the front-side processing circuit 41 stores, into the buffer 411 provided therein, the predetermined amount of image data read out from the SDRAM 34 (S2). Next, the front-side processing circuit 41 executes compression processing of compressing the image data stored in the buffer 411, from a bitmap format into a JBIG format, a JPEG format, or the like, for example (S3).

Thereafter, the front-side processing circuit 41 determines whether or not the back-side processing circuit 42 is currently being used (S4). Specifically, the back-side processing circuit 42 inputs use information indicating whether or not the back-side processing circuit 42 itself is currently in a used state, to the front-side processing circuit 41. For example, the back-side processing circuit 42 rewrites the value of a use state flag provided in the front-side processing circuit 41 or the back-side processing circuit 42, into "0" (unused state) or "1" (used state), in accordance with whether or not the back-side processing circuit 42 itself is in a used state. Thus, the front-side processing circuit 41 can determine whether or not the back-side processing circuit 42 is currently being used, by referring to the value of the use state flag. It is noted that the use information indicating whether or not the back-side processing circuit 42 is in a used state may be sent to the CPU 31, and then the CPU 31 may send the use information to the front-side processing circuit 41.

Here, if the front-side processing circuit 41 has determined that the back-side processing circuit 42 is currently being used (YES in S4), the front-side processing circuit 41 stores the image data into the buffer 412 provided therein (S5). Thereafter, the front-side processing circuit 41 transmits the image data processed by the compression processing and stored in the buffer 412, together with its writing address in the SDRAM 34, to the memory control portion 35, so that the image data is written into the SDRAM 34 (S6). It is noted that the writing address is information set in advance by the CPU 31 and inputted to the front-side processing circuit 41 in the image reading processing executed by the CPU 31. Therefore, for example, in the case where the both-side image reading processing of reading image data from both sides of a document sheet P is executed in the scanner 10 so that the back-side processing circuit 42 is in a used state, the front-side processing circuit 41 uses only the buffer 412 as a write buffer.

On the other hand, if the front-side processing circuit 41 has determined that the back-side processing circuit 42 is currently in an unused state (No in S4), the front-side processing circuit 41 determines whether or not there is a free space in the buffer 422 of the back-side processing circuit 42 (S41). Specifically, the back-side processing circuit 42 inputs free space information indicating whether or not there is a free space equal to or more than a predetermined threshold value in the buffer 422, to the front-side processing circuit 41. For example, the back-side processing circuit 42 rewrites the value of a free space flag provided in the front-side processing circuit 41 or the back-side processing circuit 42, into "0" (no free space) or "1" (free space is present), in accordance with whether or not there is a free space equal to or more than the threshold value in the buffer 422. Thus, specifically, the front-side processing circuit 41 can determine whether or not there is a free space in the buffer 422 of the back-side processing circuit 42, by referring to the value of the free space flag. It is noted that the back-side processing circuit 42 may send, to the CPU 31, the free space information indicating whether or not there is a free space equal to or more than the threshold value in the buffer 422, and then the CPU 31 may send the free space information to the front-side processing circuit 41.

Here, if the front-side processing circuit 41 has determined that there is no free space in the buffer 422 (No in S41), the front-side processing circuit 41 executes the same processing as in steps S5 and S6. That is, only in the case where the back-side processing circuit 42 is not in an unused state or the buffer 422 is saturated, the front-side processing circuit 41 uses the buffer 412 as a write buffer. On the other hand, during a period until the buffer 422 of the back-side processing circuit 42 is saturated, the front-side processing circuit 41 uses the buffer 422 as a write buffer, as described later.

Then, if the front-side processing circuit 41 has determined that there is a free space in the buffer 422 (Yes in S41), the front-side processing circuit 41 inputs the image data processed by the compression processing, together with the writing address, to the back-side processing circuit 42 via the transmission path 5 (S42).

Thus, the back-side processing circuit 42 stores the image data processed by the compression processing and inputted from the front-side processing circuit 41, into the buffer 422. That is, the front-side processing circuit 41 stores the image data processed by the compression processing into the buffer 422 provided outside the front-side processing circuit 41. Then, the back-side processing circuit 42 transmits the image data stored in the buffer 422, together with the writing address, to the memory control portion 35. Thereafter, the memory control portion 35 stores the image data at the writing address in the SDRAM 34. That is, the front-side processing circuit 41 causes the back-side processing circuit 42 to execute writing processing for the image data from the buffer 422 into the SDRAM 34, thereby writing the image data into the SDRAM 34. It is noted that when the image data is written into the SDRAM 34 by the front-side processing circuit 41 and the back-side processing circuit 42, each image data is stored at the writing address set in advance by the CPU 31. Therefore, even if each predetermined amount of the image data is stored into the SDRAM 34 in random order by the front-side processing circuit 41 and the back-side processing circuit 42, the whole image data can be reproduced.

As described above, in the scanner 10, in the case where the back-side processing circuit 42 is not being used, the front-side processing circuit 41 can use the buffer 412 and the buffer 422 as working areas when writing the image data into the SDRAM 34. That is, the front-side processing circuit 41 can execute the compression processing, using the buffer 412 and the buffer 422 of the back-side processing circuit 42 in an unused state. Therefore, a working area where the front-side processing circuit 41 can store the image data processed by the compression processing is expanded as compared to the case where the front-side processing circuit 41 can store the image data processed by the compression processing only into the buffer 412. In such a configuration, it is sufficient that the front-side processing circuit 41 has the buffers 411 and 412 of one system, thus reducing the magnitude of configuration of the front-side processing circuit 41.

In the front-side processing circuit 41, for example, when writing of image data into the SDRAM 34 in the control portion 3 is intensively performed, the information amount of image data that can be read out from the SDRAM 34 increases, and therefore reduction in the processing capability is suppressed. Specifically, in the conventional configuration using only the buffer 412, the information amount of image data that can be read out from the SDRAM 34 is restricted within an amount of the image data that can be stored into the buffer 412 after the compression processing. However, in the configuration that the buffer 412 and the buffer 422 can be used as described above, the information amount of image data that can be read out from the SDRAM 34 is permitted within an amount of the image data that can be stored into the buffer 412 and the buffer 422 after the compression processing. Therefore, by storing the image data processed by the compression processing into the buffer 412 and the buffer 422, the front-side processing circuit 41 can read out a large amount of image data from the SDRAM 34 as compared to the conventional configuration, thus suppressing reduction in the processing capability of the front-side processing circuit 41.

The use state of the back-side processing circuit 42 can be clearly determined in accordance with whether an image reading target is one side or both sides of a document sheet P. Therefore, the original function of the back-side processing circuit 42 is prevented from being inhibited by the front-side processing circuit 41 using the back-side processing circuit 42.

Here, the front-side processing circuit 41 and the back-side processing circuit 42 are electronic circuits for executing respective information processes whose functions are different in that their respective processing targets are image data of the front side and image data of the back side of a document sheet P. Meanwhile, the first electronic circuit and the second electronic circuit according to the present disclosure are not limited to circuits for executing the same information processing such as the compression processing, but may be electronic circuits having buffers and capable of reading and writing data with respect to the SDRAM 34.

The front-side processing circuit 41 may store the image data processed by the compression processing into the buffer 412 in principle, and may write the image data from the buffer 412 into the SDRAM 34. In this case, only when writing into the SDRAM 34 is delayed, the front-side processing circuit 41 may write the image data into the SDRAM 34 via the buffer 422. It is noted that the front-side processing circuit 41 may directly access the buffer 422 of the back-side processing circuit 42 to write the image data thereto, and may read out the image data from the buffer 422 to write the image data into the SDRAM 34.

Also, the front-side processing circuit 41 can read out the image data from the SDRAM 34, using the buffer 411 and the buffer 421 as working areas. For example, when image data is read out from the SDRAM 34, the front-side processing circuit 41 alternately stores the image data into the buffer 411 and the buffer 421. Thus, even in the case where readout of data from the SDRAM 34 in the control portion 3 is intensively performed and the readout of the image data is delayed, the front-side processing circuit 41 can execute compression processing for image data stored in the buffer 411 and the buffer 421. It is noted that the image data processed by the compression processing is stored into the buffer 412 and the buffer 422. In this case, the back-side processing circuit 42 may execute compression processing for the image data stored in the buffer 421.

In the above embodiment, the back-side processing circuit 42 is an example of the second electronic circuit. However, instead of the back-side processing circuit 42, another electronic circuit provided in the scanner 10 may be used as the second electronic circuit.

Specifically, the scanner 10 may include a USB circuit (example of second electronic circuit), to which a USB device such as a USB memory can be connected, for controlling reading and writing of data with respect to the USB device. In this case, the front-side processing circuit 41 and the USB circuit are directly connected through a transmission path (example of second transmission path) other than the bus 30.

When the USB circuit is in an unused state, the front-side processing circuit 41 can execute the compression processing, using a buffer provided in the USB circuit. Specifically, when the USB device is not connected to the USB circuit, the front-side processing circuit 41 can determine that the USB circuit is in an unused state. Therefore, the original function of the USB circuit is prevented from being inhibited by the front-side processing circuit 41 using the USB circuit. It is noted that the front-side processing circuit 41 acquires use information indicating whether or not the USB device is connected to the USB circuit, i.e., the use state of the USB circuit, directly from the USB circuit or indirectly via the CPU 31.

A plurality of other electronic circuits (example of second electronic circuit) such as the back-side processing circuit 42 and the USB circuit may be connected to the front-side processing circuit 41, and the front-side processing circuit 41 may select and use any of the plurality of electronic circuits. For example, priorities may be set in advance for the plurality of electronic circuits, and the front-side processing circuit 41 may select the electronic circuit in accordance with the priorities. The front-side processing circuit 41 does not necessarily need to use one of plurality of electronic circuits, but may execute the compression processing, using buffers of some of the electronic circuits as working areas.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An information processing apparatus comprising:
a first electronic circuit having a first buffer for storing information, the first electronic circuit being configured to execute predetermined first information processing by reading out information from a memory connected via a first transmission path, and write the information processed by the first information processing into the memory; and
one or a plurality of second electronic circuits having a second buffer for storing information, and connected to the first electronic circuit via a second transmission path different from the first transmission path, the one or plurality of second electronic circuits being configured to execute second information processing different from the first information processing, wherein
the first electronic circuit configured to execute the first information processing, using the second buffer of the second electronic circuit that is in an unused state and the first buffer;
the one or plurality of second electronic circuits rewrites a value of a use state flag provided in the first electronic circuit or the one or plurality of second electronic circuits in accordance with whether or not the one or plurality of second electronic circuits is in a used state, and rewrites a value of a free space flag provided in the first electronic circuit or the one or plurality of second electronic circuits in accordance with whether or not there is a free space equal to or more than a predetermined threshold value in the second buffer,
the first electronic circuit uses the first buffer only when the first electronic circuit determines, upon referring to the use state flag, that there is no second electronic circuit that is in an unused state, or determines, upon referring to the free space flag, that a free space of the second buffer of the second electronic circuit that is in an unused state is equal to or less than the threshold value;
the first information processing is processing by which an information amount of the information after the first information processing becomes smaller than an information amount of the information before the first information processing;
the first information processing is compression processing; and
only when writing the information into the memory is delayed, the first electronic circuit writes the information into the memory via the second buffer.

2. The information processing apparatus according to claim 1, wherein the first electronic circuit stores the information read out from the memory into the first buffer, stores the information processed by the first information processing into the second buffer, and writes the information from the second buffer into the memory.

3. The information processing apparatus according to claim 2, wherein the first electronic circuit causes the second electronic circuit to execute writing processing of writing the information from the second buffer into the memory.

4. The information processing apparatus according to claim 1, wherein the information is image data.

5. The information processing apparatus according to claim 4, further comprising two image reading portions configured to read image data simultaneously from a front side and a back side of a document sheet, wherein
the first electronic circuit executes the first information processing for image data read by one of the image reading portions, and the second electronic circuit executes the second information processing for image data read by the other image reading portion.

6. The information processing apparatus according to claim 1, wherein
one of the second electronic circuits is a USB control circuit configured to read and write information with respect to a USB device connected to the information processing apparatus, and
the first electronic circuit determines that the USB control circuit is in an unused state, when the USB device is not connected to the information processing apparatus.

7. The information processing apparatus according to claim 1, wherein the first electronic circuit stores the information read out from the memory into the first buffer and the second buffer, and executes the first information processing for the information stored in the first buffer and the second buffer.

* * * * *